United States Patent [19]

Sumii et al.

[11] Patent Number: 5,217,799

[45] Date of Patent: Jun. 8, 1993

[54] SURFACE MATERIALS FOR INTERIOR MATERIALS OF CARS

[75] Inventors: Yoshiyuki Sumii, Moriyama; Nobuo Fujiki, Shiga, both of Japan

[73] Assignee: Japan Vilene Co., Ltd., Tokyo, Japan

[21] Appl. No.: 899,147

[22] Filed: Jun. 17, 1992

Related U.S. Application Data

[63] Continuation of Ser. No. 647,201, Jan. 28, 1991, abandoned, which is a continuation of Ser. No. 242,097, Sep. 9, 1988, abandoned.

[51] Int. Cl.$^5$ .................. D04H 1/08; B32B 27/34; B32B 5/06; B32B 5/22
[52] U.S. Cl. .................. 428/280; 428/286; 428/287; 428/290; 428/300; 428/301; 428/302
[58] Field of Search .............. 428/91, 281, 286, 287, 428/290, 300, 301, 302, 280

[56] References Cited

U.S. PATENT DOCUMENTS

| | | | |
|---|---|---|---|
| 4,258,093 | 3/1981 | Benedyk | 428/300 |
| 4,258,094 | 3/1981 | Benedyk | 428/300 |
| 4,808,466 | 2/1989 | Kotani et al. | 428/286 |
| 4,818,586 | 4/1989 | Smith et al. | 428/300 |
| 4,859,508 | 8/1989 | Pangrazi et al. | 428/290 |
| 4,892,785 | 1/1990 | Pangrazi et al. | 428/290 |

FOREIGN PATENT DOCUMENTS

| | | | |
|---|---|---|---|
| 58-7890 | 1/1983 | Japan . | |
| 59-79674 | 5/1984 | Japan . | |
| 0200805 | 11/1984 | Japan . | |
| 1132665 | 6/1986 | Japan | 428/300 |
| 3039330 | 2/1988 | Japan | 428/300 |

OTHER PUBLICATIONS

Iwakiri et al, English translation of JP 63-39330, pp. 1-11.

*Primary Examiner*—George F. Lesmes
*Assistant Examiner*—Terrel Morris
*Attorney, Agent, or Firm*—Armstrong, Westerman, Hattori, McLeland & Naughton

[57] ABSTRACT

A surface material for interior materials of cars comprising a needle punched felt of which one side surface is needle punched and is impregnated with a synthetic resin emulsion and a web composed of a hot-melt fiber, which is laminated on the impregnated surface of the needle punched felt, and having a 30% modulus of not more than 9 kg/5 cm.width and the shape stability of at least than 60% after shaping. According to the present invention, a surface material for interior materials of cars showing excellent elongation when deep drawing without abrasion can be realized.

1 Claim, 1 Drawing Sheet

SURFACE MATERIALS FOR INTERIOR MATERIALS OF CARS

This application is a continuation of application Ser. No. 07/647,201, filed on Jan. 28, 1991, which is a continuation of Ser. No. 07/242,097, filed on Sep. 9, 1988, both now abandoned.

BACKGROUND OF THE INVENTION

The present invention relates to a surface material for interior materials of cars, and more particularly to a surface material for interior materials of cars which can be suitably used as ceiling materials of cars, and the like.

Conventionally, needle punched felts which are dipped into a synthetic resin emulsion are employed as surface materials for interior materials of cars. The conventional needle punched felts ordinarily have 30% moduli of more than 10 kg/5 cm.width, that is, the conventional needle punched felts are lack in elongation. Accordingly, when the needle punched felts are subjected to deep drawing, there is a large problem that the needle punched felts cannot be shaped in accordance with molds since strain and returning of the needle punched felts are caused by the lack of elongation.

As the other surface material made of a needle punched felt, there is proposed a surface material made of a needle punched felt containing a thermoplastic fiber. The needle punched felt can be shaped in accordance with a mold since the thermoplastic fiber in the felt is molten at shaping and the molten thermoplastic fiber moves freely in the felt until the shaping is finished and after the shaping, the fibers are bonded together. However, there are such problems that the felt is poor in shape stability and durability required for interior materials.

In order to remove the defects of the above surface materials made of needle punched felts, there are proposed surface materials produced by laminating a needle punched felt which is dipped into a synthetic resin emulsion on a needle punched felt containing a thermoplastic fiber (refer to Japanese Unexamined Utility Model Publication No. 7890/1983 and Japanese Unexamined Patent Publication No. 76974/1984). However, the defects of each surface material are not sufficiently removed, and there is remained a problem that when the surface material is laminated on a substrate, the surface material is peeled from the substrate at the portion of the deep drawing.

Also, there has not yet been proposed a surface material made of a napping non-woven fabric having soft feeling and being excellent in shape stability, which can be preferably used as a surface material for interior materials of cars.

The object of the present invention is to solve the above-mentioned problems of the conventional surface materials and to provide a surface material for interior materials of cars having (a) no abrasion between the surface material and a substrate at the portion of the deep drawing when the surface material and the substrate are subjected to deep drawing to give an interior material, (b) an excellent shape stability and (C) a soft feeling.

These and other objects of the present invention will become apparent from the description hereinafter.

SUMMARY OF THE INVENTION

In accordance with the present invention, there is provided a surface material for interior materials of cars comprising a needle punched felt of which one side surface is needle punched and is impregnated with a synthetic resin emulsion and a web composed of a hot-melt fiber, which is laminated on the impregnated surface of the needle punched felt, and having a 30% modulus of not more than 9 kg/5 cm.width and a shape stability of at least 60% after shaping.

Accordingly, there can be provided a surface material used in interior materials of cars having no abrasion between the surface material and the substrate when being subjected to deep drawing.

DETAILED DESCRIPTION

Figure 1:
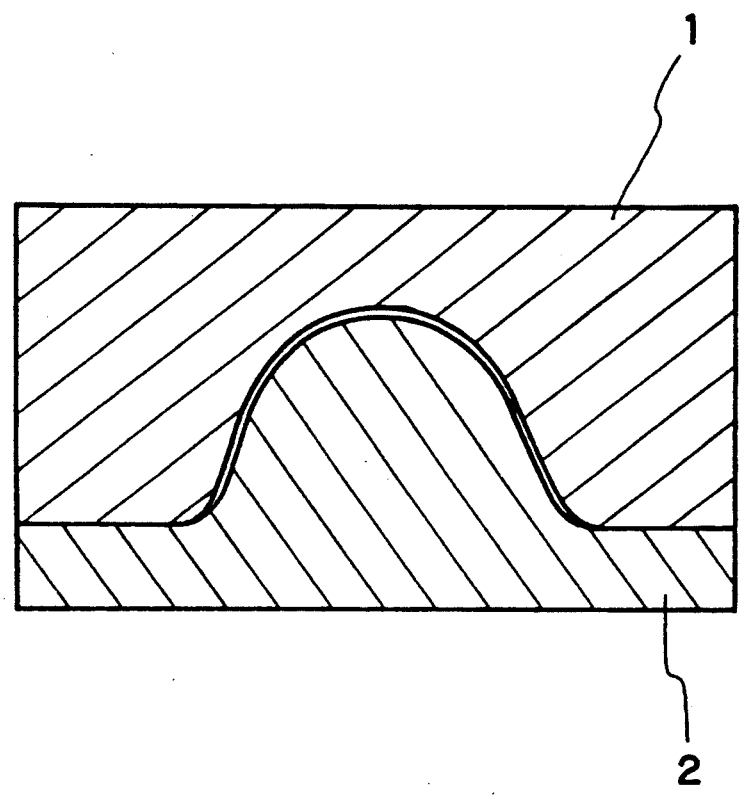
FIG. 1 shows a schematic sectional view of a metal mold for measuring of shape stability of the surface materials prepared in Examples 1 to 6 of the present invention and Comparative Examples 1 to 3.

The terminology "30% modulus" in the specification is intended to refer to a stress (kg/5 cm.width) when the elongation percentage of a base fabric, that is, a surface material is 30%.

Examples of a fiber used in a needle punched felt are, for instance, synthetic fibers such as a polyester fiber, a polyamide fiber, a polypropylene fiber, a polyvinyl chloride fiber, a polyvinylidene chloride fiber and an ethylene-vinyl acetate copolymer fiber; semisynthetic fibers such as a rayon fiber and an acetate fiber; and natural fibers such as cotton and sheep wool. Among them, the polyester fiber is most suitably used since the polyester fiber is excellent in weather resistance, lightfastness, abrasion resistance, heat resistance, and the like. In the present invention, a fiber having a size of 0.5 to 30 deniers and a length is of 5 to 100 mm is generally empolyed in the needle punched felt.

The needle punched felt is prepared by needle punching one side surface of a web composed of the above-mentioned fiber. Generally, it is preferable that the needle density and needle depth are adjusted to be within a range of 100 to 500 needles/cm$^2$ and within a range of 3 to 20 mm, respectively. The reason why only one side surface of the web is needle punched is that the other side surface which is not needle punched is used as the surface of an interior material having soft feeling and napping.

The thickness of the needle punched felt cannot be absolutely determined since the thickness depends on the desired strength and thickness of an obtained surface material for interior materials and the kinds of fibers used in the needle punched felt. However, it is preferable that the thickness is adjusted to be within a range of 0.5 to 4.0 mm, more preferably within a range of 1.0 to 3.0 mm.

When a needle punched felt having an area weight of less than 50 g/m$^2$ is laminated on a substrate, the web composed of a hot-melt fiber or the substrate is seen through the needle punched felt, so that the appearance of an obtained interior material deteriorates. To the contrary, when the area weight is more than 500 g/m$^2$, elongation of an obtained surface material is lowered. Accordingly, it is preferable to use a needle punched felt having an area weight of 50 to 500 g/m$^2$.

As a synthetic resin emulsion which is impregnated into the needle punched felt, any conventional emulsion containing a solid component composed of a synthetic resin having a melting temperature of 100° to 180° C., preferably 100° to 150° C., such as styrene-acrylic resin emulsions, ethylene-vinyl acetate resin emulsions, ethylene-vinyl chloride resin emulsions, ethylene-vinyl chloride-vinyl acetate resin emulsions, acrylic acid ester resin emulsions or vinyl acetate copolymer emulsions can be suitably used. Among them, styrene-acrylic resin emulsions can be particularly suitably used since when the styrene-acrylic resin emulsion is used, the shapability of the surface material at shaping and shape stability after shaping are remarkably improved. As the styrene-acrylic copolymer, it is preferable to use a styrene-acrylic copolymer prepared by polymerizing 35 to 80% by weight of a styrene monomer and 65 to 20% by weight of an acrylic acid ester. The concentration of the synthetic resin in the emulsion depends on the kind of the emulsion, and is usually adjusted to be within a range of 5 to 65% by weight based upon the total amounts of the emulsion.

The synthetic resin emulsion is impregnated into the needle punched surface of the needle punched felt. When the thickness of the synthetic resin emulsion impregnated layer is less than 10% of the thickness of the needle punched felt, the shaped felt cannot hold the desired shape. To the contrary, when the thickness exceeds 70% of the thickness of the needle punched felt, feeling becomes hard and the synthetic resin emulsion sometimes oozes to the other surface of the felt. Accordingly, it is preferable that the thickness of the impregnated layer is 10 to 70% of the thickness of the needle punched felt. Further, it is preferable that the synthetic resin emulsion is impregnated into the needle punched felt under the condition that the ratio of the weight of needle punched felt (hereinafter referred to as "F") to the weight of the solid component of the synthetic resin emulsion (hereinafter referred to as "B"), that is, F/B is adjusted to be 60/40 to 95/5, preferably 70/30 to 95/5. When F/B is less than 60/40, the feeling of an obtained surface material comes to be hard and shapability is deteriorated. To the contrary, F/B is more than 95/5, durabilities such as abrasion resistance and elongation deteriorate because of the lack of the effect of backing.

The web composed of the hot-melt fiber is provided on the synthetic resin emulsion impregnated surface of the needle punched felt in order to firmly bond the surface material with a substrate. It is preferable that the melting temperature of the hot-melt fiber is 20° C. lower than that of the fiber of the needle punched felt in order to prevent the fiber of the needle punched felt from melting or deforming at the time of bonding the surface material with the substrate by heating to melt the web. As a fiber used in the web, a fiber of which melting temperature is from 110° to 125° C. and softening temperature is from 75° to 95° C. can be used. Examples of the fiber are, for instance, a polyester fiber, a polyamide fiber, a polyolefine fiber such as a polyethylene fiber or a polypropylene fiber, a fiber of ethylene-vinyl acetate copolymer, and the like.

Representative examples of the web composed of the hot-melt fiber are, for instance, a web having a form like a spider's net or a film which is prepared by gathering the filaments which are produced by extruding a molten raw material through a nozzle to the air and cooling the filaments, and the like.

When the thickness of the web is less than 10 μm, the web is sometimes broken when the elongaion percentage of the surface material attains to 40%. To the contrary, when the thickness of the web is more than 300 μm, the shapability at deep drawing is deteriorated. Accordingly, it is preferable that the thickness of the web is within a range of 10 to 300 μm.

The web composed of the hot-melt fiber is laminated on the synthetic resin emulsion impregnated surface of the felt and then they are heated at a temperature of 75° to 125° C. to give a surface material of which needle punched felt is bonded together with the web.

From the viewpoint of lightening and shapability of the surface material, it is preferable that the thickness and the area weight of the surface material are not more than 3.0 mm and not more than 300 g/m$^2$, respectively. On the other hand, from the viewpoint of durability and strength, it is preferable that the thickness and the area weight of the surface material is not less than 1.0 mm and not less than 120 g/m$^2$, respectively.

Since the 30% modulus of the surface material of the present invention is not more than 9 kg/5 cm. width, the surface material is not peeled off from a substrate at the part to which deep drawing is applied when the materials are subjected to deep drawing. Further, the interior material which is produced by bonding the surface material and a substrate is extremely excellent in shapability since the shape stability after shaping is not less than 60%.

The surface material of the present invention is laminated on a substrate so as that the web of the surface material faces to the substrate, and the substrate and the surface material are shaped during they are bonded together by heating so that an interior material for cars is produced. As the substrate, conventional materials can be employed. Examples of the substrate are, for instance, a resin felt, a plastic foamed article, a wood stock composed of a plastic such as polypropylene in which 30 to 60% by weight of small pieces of wood is contained, and the like.

The bonding of the surface material and the substrate is carried out by laminating the web of the surface material on the substrate and melting the web by hot pressing, and the like. When they are bonded by hot pressing, it is preferable that the pressing pressure is about 1 to 60 kg/cm$^2$, and the heating temperature is 90° to 160° C.

The obtained interior material of the present invention can be used as it is or by processing to have a prescribed shape as an interior material of cars such as a ceiling material, a rear package material, a door material or a trunk material.

The present invention is more specifically described and explained by means of the following Examples. It is to be understood that the present invention is not limited to the Examples, and various changes and modifications may be made in the invention without departing from the spirit and scope thereof.

EXAMPLE 1

After a polyester spun dyed fiber (fineness: 3 deniers, fiber length: 40 mm) is carded to form a web (area weight: 200 g/m$^2$), one side surface of the web is needled density: 320 strokes/cm$^2$, needle depth: 10 mm) to give a needle punched felt. A styrene-acrylate copolymer emulsion shown in Table 1 is impregnated into the needle punched surface of the needle punched felt with adjusting the thickness of impregnated layer of the emulsion to be about 1.2 mm, and the needle punched felt was dried with a drier to give a non-woven fabric (thickness: 2.2 mm, area weight: 220 g/m$^2$, F/B: 91/9) having a napping surface. The emulsion impregnated surface of the obtained non-woven fabric is laminated on web (area weight: 30 g/m$^2$, thickness: 200 μm, softening temperature: 95° C., melting temperature: 110° to 125° C.) composed of a fiber made of a copolymer of nylon-6, nylon-6, 6 and nylon-12 (hereinafter referred to as "polyamide copolymer") and is heated to 110° C. to bond the non-woven fabric and the web. The obtained surface material for interior materials of cars had a thickness of 2.4 mm and area weight of 250 g/m$^2$. As the physical properties of the surface material, shape stability and abrasion resistance between the surface material and the substrate are measured in accordance with the following methods. The results are shown in Table 1.

(Shape stability)

A surface material was placed on a metal mold 2 shown in FIG. 1, and then a metal mold 1 was placed on the surface material with a clearance of 1 mm. The temperature of the metal mold 1 was adjusted to be 95°±5° C., and the temperature of the metal mold 2 was adjusted to be 150°±10° C. The surface material was pressed at a pressing pressure of 2 kg/cm$^2$ for 30 seconds to give a formed article having a bowl-like shape.

The height H (mm) of the formed article was measured, and the shape stability was decided by the following formula (I):

$$[\text{Shape stability (\%)}] = \frac{H(\text{mm})}{[\text{Depth of the metal mold (50 mm)}]} \times 100 \quad (I)$$

When the shape stability is not less than 60%, it is determined that the surface material can be practically employed in deep drawing.

Abrasion Resistance

A substrate which was beforehand shaped to have a prescribed shape was placed on a female metal mold having a shape corresponding to a ceiling of a car. The surface material was placed on the substrate so that the web composed of a hot-melt fiber was faced to the base material. The male metal mold was placed on the surface material with a clearance of the thickness of the base material and 1 mm. The temperature of the male metal mold was adjusted to be 95°±5° C., and the temperature of the female metal mold was adjusted to be 150°±10° C., and then, the materials were pressed at a pressing pressure of 2 kg/cm$^2$ for 30 seconds to give a ceiling of a car.

The obtained ceiling material was cut at the portion which was subjected to deep drawning to give test pieces having a width of 30 mm and a length of 150 mm. The abrasion resistance between the substrate and the surface material was measured with a tensile testing machine (made by Bold Win Co., Ltd.) under the abrasion speed of 200 mm/min.

Only when the abrasion resistance could not be measured since the surface material or the base material was broken due that the abrasion resistance was too strong, or when the abrasion resistance was not less than 3 kg/30 mm.width, it is considered that the obtained ceiling material can be employed in practical uses.

EXAMPLE 2

A surface material was produced in the same manner as in Example 1 except that a web composed of a polyamide fiber (area weight : 30 g/m$^2$, thickness: 200 μm, softening temperature: 90° C., melting temperature: 110° C.) was used instead of the web used in Example 1. The physical properties of the obtained surface material were measured in the same manner as in Example 1. The results are shown in Table 1.

EXAMPLE 3

A surface material was produced in the same manner as in Example 1 except that a non-woven fabric (thickness: 1.7 mm, area weight: 160 g/m$^2$, F/B: 60/40) was used instead of the non-woven fabric used in Example 1. The physical properties of the obtained surface material were measured in the same manner as in Example 1. The results are shown in Table 1.

EXAMPLE 4

A surface material was produced in the same manner as in Example 1 except that a non-woven fabric (thickness: 2.4 mm, area weight: 240 g/m$^2$, F/B: 95/5) was used instead of the non-woven fabric used in Example 1. The physical properties of the obtained surface material were measured in the same manner as in Example 1. The results are shown in Table 1.

EXAMPLE 5

A surface material having a thickness of 3 mm was produced in the same manner as in Example 1 except that a non-woven fabric (thickness: 2.8 mm, area weight 270 g/m$^2$) was used instead of the non-woven fabric used in Example 1. The physical properties of the obtained surface material were measured in the same manner as in Example 1. The results are shown in Table 1.

EXAMPLE 6

A surface material having a thickness of 1 mm was produced in the same manner as in Example 1 except that a non-woven fabric (thickness: 0.8 mm, area weight: 100 g/m$^2$) was used instead of the non-woven fabric used in Example 1. The physical properties of the obtained ceiling material were measured in the same manner as in Example 1. The results are shown in Table 1.

COMPARATIVE EXAMPLE 1

A surface material was produced in the same manner as in Example 1 except that a butyl-acrylate copolymer emulsion shown in Table 1 was used instead of a styrene-acrylic copolymer emulsion used in Example 1. The physical properties of the obtained ceiling material were measured in the same manner as in Example 1. The results are shown in Table 1.

COMPARATIVE EXAMPLE 2

A ceiling material was produced in the same manner as in Example 1 except that a web composed a polyamide fiber (area weight: 30 g/m$^2$, thickness: 200 μm, softening temperature: 90° C., melting temperature: 105° C.) was used instead of the web used in Example 1. The physical properties of the obtained ceiling material were measured in the same manner as in Example 1. The results are shown in Table 1.

COMPARATIVE EXAMPLE 3

A ceiling material was made in the same manner as in Example 1 except that a polyethylacrylate emulsion was used instead of a styrene-acrylate copolymer emulsion as a synthetic resin emulsion and that a web composed of a polyamide fiber (area weight: 30 g/m², thickness: 200 μm, softening temperature: 102° C., melting temperature: 130° C.) was used instead of a web used in Example 1. The physical properties of the obtained ceiling material were measured in the same manner as in Example 1. The results are shown in Table 1.

TABLE 1

|  | Binder | Web composed of a hot-melt fiber | | 30% modulus (kg/5 cm · width) | Ratio of shape stability (%) | Abrasion resistance (kg/3 cm · width) |
|---|---|---|---|---|---|---|
|  |  | Softening temperature (°C.) | Melting temperature (°C.) |  |  |  |
| Ex. No. |  |  |  |  |  |  |
| 1 | Styrene-acrylate copolymer emulsion[*1] | 95 | 115 to 125 | 8.5 | 65 | At least 3.5 (The surface material was broken.) |
| 2 | Styrene-acrylate copolymer emulsion[*1] | 90 | 110 | 8.6 | 62 | 3.2 |
| 3 | Styrene-acrylate copolymer emulsion[*1] | 95 | 115 to 125 | 8.9 | 71 | At least 3.7 (The surface material was broken.) |
| 4 | Styrene-acrylate copolymer emulsion[*1] | 95 | 115 to 125 | 8.5 | 64 | At least 3.5 (The surface material was broken.) |
| 5 | Styrene-acrylate copolymer emulsion[*1] | 95 | 115 to 125 | 9.0 | 62 | At least 3.5 (The surface material was broken.) |
| 6 | Styrene-acrylate copolymer emulsion[*1] | 95 | 115 to 125 | 8.3 | 65 | At least 3.5 (The surface material was broken.) |
| Comparative Example No. |  |  |  |  |  |  |
| 1 | Butyl-acrylate copolymer emulsion[*2] | 95 | 115 to 125 | 9.3 | 50 | 0.8 |
| 2 | Styrene-acrylate copolymer emulsion[*1] | 90 | 105 | 8.8 | 65 | Abrasion generated. |
| 3 | Polyethyl-acrylate emulsion[*3] | 102 | 130 | 13.7 | 55 | Abrasion generated. |

(Note)
[*1] Available from MITSUBISHI PETROCHEMICAL BADISCHE, COMPANY, LTD as a commercial names of Acronal 7304D.
[*2] Available from DAINIPPON INK AND CHEMICALS, INC. as a commercial name of Voncoat R-3218.
[*3] Available from Nippon Zeon Co., Ltd., as a commercial name of Nipol X-851.

From the results shown in Table 1, it is obvious that the surface material for interior materials of cars obtained in Examples 1 to 6 are superior in shape stability and abrasion resistance to the conventional surface materials for interior materials of cars obtained in Comparative Examples 1 to 3.

Since the surface material for the interior materials of cars of the present invention is composed of (a) a needle punched felt of which needle punched surface is impregnated with a synthetic resin emulsion and (b) a web composed of a hot-melt fiber which is laminated on the impregnated surface of the needle punched felt, and has a 30% modulus of not more than 9 kg/5 cm.width and the shape stability of at least 60%, which are suitably adjusted by selecting the needling conditions, kinds and quantity of a resin used in a web, the surface material for interior materials of cars has the following excellent properties:

Since the surface material has suffient elongation, the surface material is easily shaped in accordance with the mold and no abrasion occurs between the surface material and the substrate when the material is subjected to deep drawing.

In addition to the materials used in the examples, other materials can be used as set forth in the specification to obtain substantially the same results.

What is claimed is:

1. A surface material for interior materials of cars comprising:

a needle punched felt having a first and second side surface, wherein said first side surface is needle punched, the needle punched first side surface being impregnated with a styrene-acrylate copolymer emulsion so that the thickness of the impregnated layer is 10 to 70% of the thickness of the needle punched felt, and a web composed of a hot-melt fiber having a melting temperature of 110° to 125° C. and a thickness of 10 to 300 μm, laminated on the needle punched-impregnated first side surface of the needle punched felt, said web being the backside of the surface material and said second side surface of the needle punched felt being the front side of the surface material, said surface material having a 30% modulus of not more than 9 kg/5 cm.width and a shape stability of at least 60% after shaping.

* * * * *